July 11, 1950  J. McELHATTON  2,514,962
PORTABLE SPREADER-DEVICE

Filed May 15, 1947  3 Sheets-Sheet 1

Inventor
John Mc. Elhatton
By Ned Gerlach Atty.

July 11, 1950 J. McELHATTON 2,514,962
PORTABLE SPREADER-DEVICE
Filed May 15, 1947 3 Sheets-Sheet 2
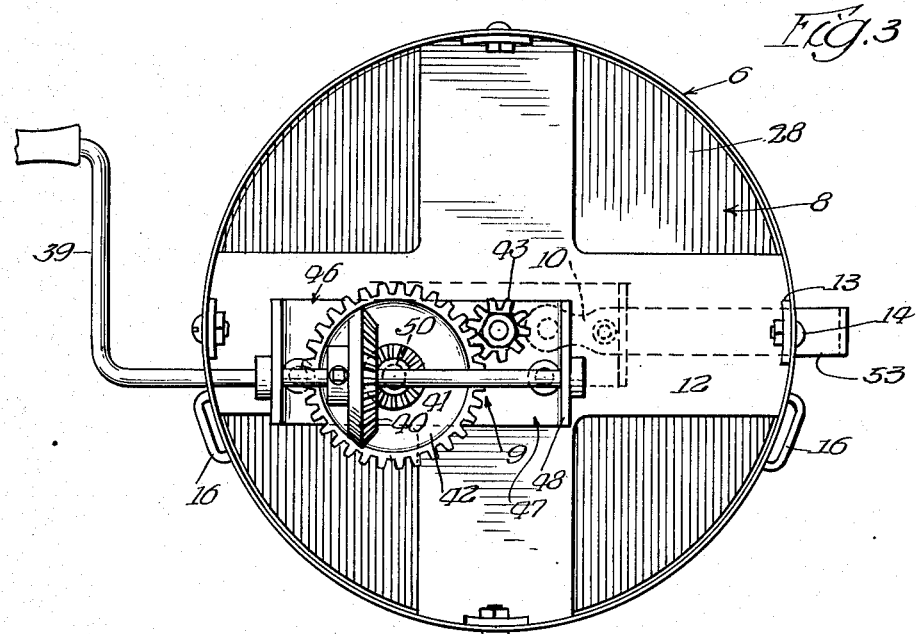
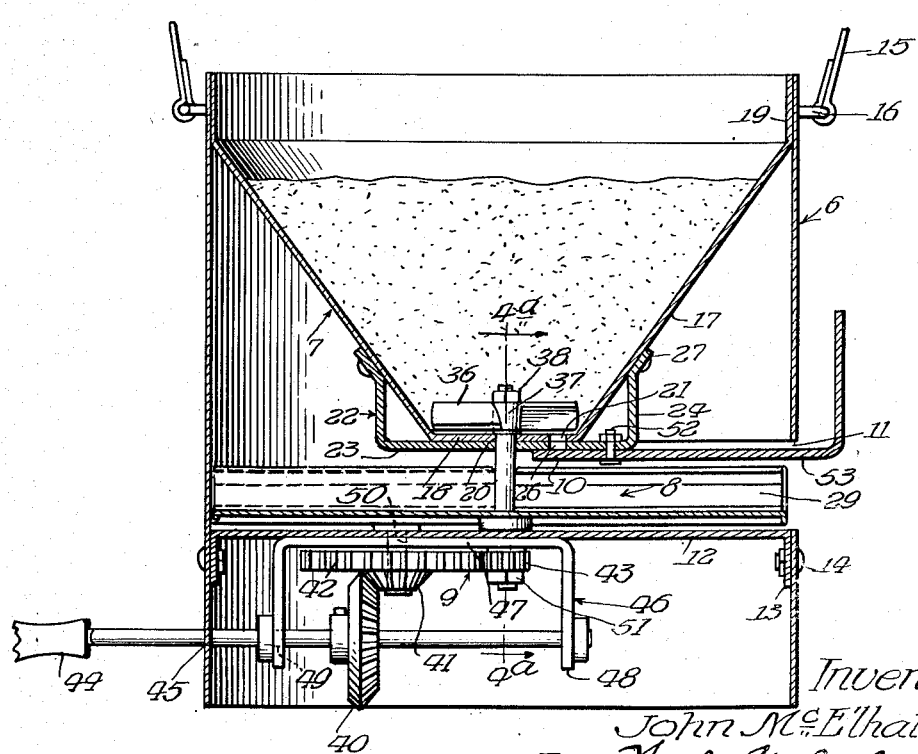

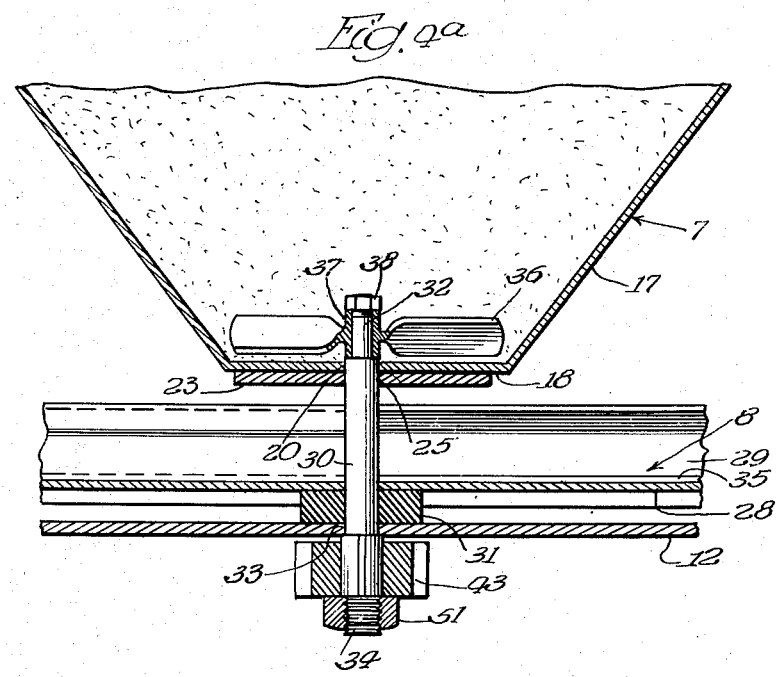
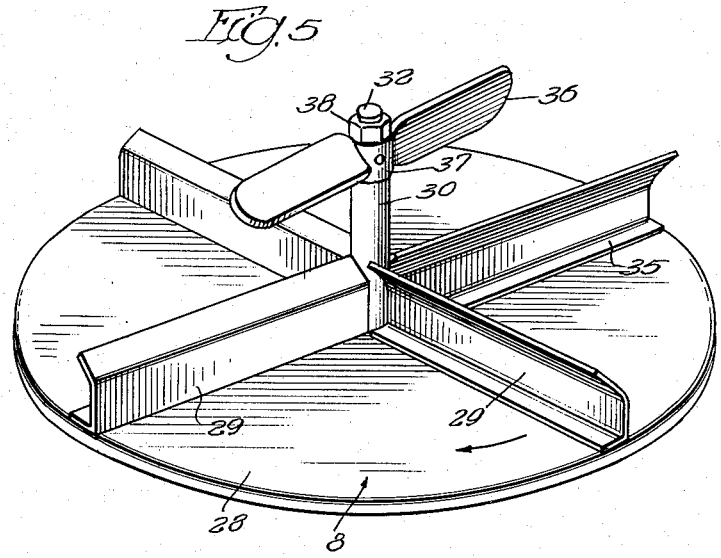

Patented July 11, 1950

2,514,962

UNITED STATES PATENT OFFICE 2,514,962

PORTABLE SPREADER DEVICE

John McElhatton, Chicago, Ill.

Application May 15, 1947, Serial No. 748,311

4 Claims. (Cl. 275—12)

The present invention relates generally to devices for spreading fertilizer, grass seed and like scattery material on lawns. More particularly the invention relates to that type of spreader-device which is adapted to be carried by the user and operated by hand, and, as its principal parts, comprises a hopper and a blade equipped rotor beneath the hopper.

One object of the invention is to provide a portable spreader-device of this type which is generally an improvement upon, and has certain inherent advantages over, previously designed devices for the same purpose and is characterized by high efficiency and a novel arrangement of parts.

Another object of the invention is to provide a spreader-device of the type under consideration in which the hopper and the blade equipped rotor are surrounded and carried by a vertically extending, open ended, cylindrical housing which is formed of sheet metal or other suitable substantially rigid material and has in its lower front portion and adjacent the rotor a horizontally extending, arcuate slot through which the material is discharged in a scattered manner during drive of the rotor.

Another object of the invention is to provide a portable spreader-device of the last mentioned character in which the discharge opening at the lower end of the hopper is controlled by means of a pivotally mounted, plate variety valve which is shiftable back and forth between open and closed positions by way of an arm that extends outwards through the discharge slot in the lower front portion of the housing.

A further object of the invention is to provide a portable spreader-device of the aforementioned character in which the blade equipped rotor is fixedly mounted on a vertically extending shaft and the upper end of such shaft extends into the lower end of the hopper and embodies radially extending, angularly disposed blades for agitating the material in the hopper and forcing it through the discharge opening in the hopper bottom during drive of the rotor.

A still further object of the invention is to provide a portable spreader-device which is generally of new and improved construction and is so designed that it occupies but a small amount of space, is light in weight and may be manufactured or fabricated at a comparatively low cost.

Other objects of the invention and the various advantages and characteristics of the present spreader-device will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 3 is a bottom view illustrating in detail the construction and design of the crank operated gearing for driving the blade equipped rotor;

Figure 4 is a vertical longitudinal section;

Figure 4A is a section on the line 4a—4a of Figure 4; and

Figure 5 is a perspective view of the blade equipped rotor and the vertical shaft on which the rotor is fixedly mounted.

Figure 1:
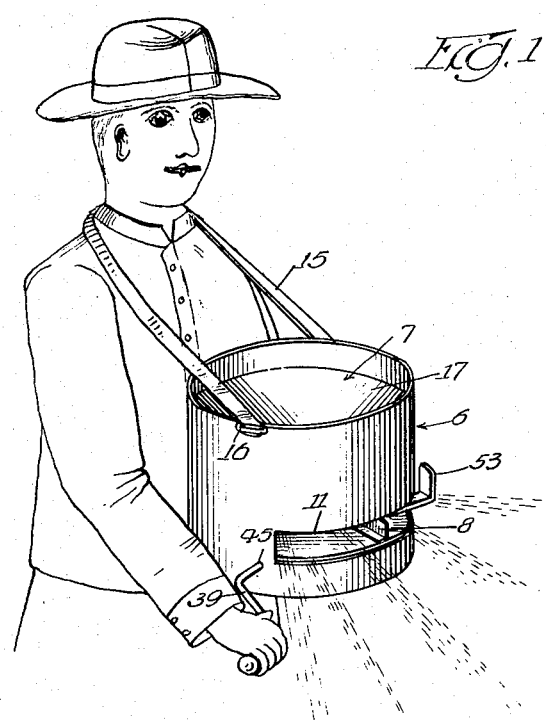
Figure 1 is a perspective view of a portable spreader-device embodying the invention.
Figure 2:
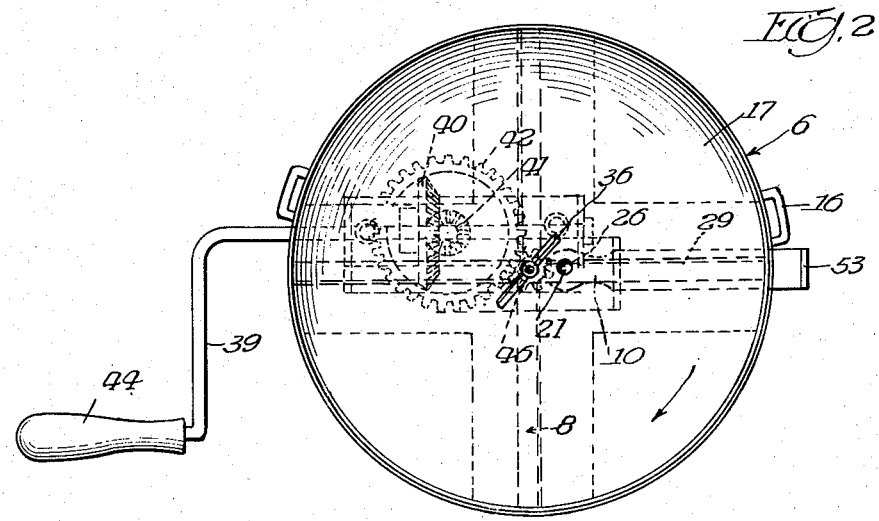
Figure 2 is a plan view.

The device which is shown in the drawings constitutes the preferred form or embodiment of the invention. Whereas it has various capabilities of use it is designed and adapted primarily to spread fertilizer, grass seed and like material on lawns. As shown in Figure 1, the device is adapted to be carried by the user. It is contemplated that the user will carry the device in front of his body and while walking over the lawn to be treated will operate the device so as to effect spreading of the material over the lawn. As its principal parts or components the spreader-device comprises a housing 6, a hopper 7, a rotor 8, rotor driving gearing 9, and a valve 10.

The housing 6 is cylindrical, embodies a continuous side wall and has open ends. It is preferably formed of sheet metal although, if desired, it may be formed of any other suitable rigid material. When the device is in use the housing, as shown in Figure 1, is positioned so that the axis thereof extends substantially vertically. The housing surrounds and serves as a supporting medium or instrumentality for the other parts of the device. An arcuate discharge slot 11 is formed in the lower front portion of the housing. This slot extends through an arc of approximately 180°. The lower end of the housing is reenforced by way of a cross-shaped crosswall 12. The latter is in horizontal alignment with the lower portion of the slot 11 and has integral, downwardly extending, right angle ears 13 which fit against the inner periphery of the housing 6 and are fixedly connected in place by way of rivets 14. As best shown in Figures 3 and 4, the rivets 14 extend through aligned holes in the ears 13 and the lower end or portion of the housing 6. The device when in use is supported in front of the body of the user by any suitable means, such, for example, as a strap 15. The latter is adapted to encircle the neck of the user and has its ends connected to a pair of loops 16 on the upper end of the housing 6. The loops are located on opposite sides of the housing and are preferably positioned one diametrically opposite the other.

The hopper 7 is located in the upper portion of the housing 6 and, like the housing, is formed of sheet metal. It is adapted to contain a batch of the scattery material to be spread and consists of a side wall 17 and a bottom wall 18. The side wall of the hopper is shaped similarly to an inverted truncated cone and has at the upper margin thereof an upwardly extending cylindrical flange 19 which fits against and is welded, soldered or otherwise fixedly secured to the upper end of the housing 6. The bottom wall 18 of the hopper is formed integrally with, and extends across, the lower margin of the side wall 17. It is circular and has formed therein a central circular hole 20 and an off center or eccentrically positioned discharge opening 21. In connection with use or operation of the spreader-device the material in the hopper feeds downwards through the discharge opening 21 onto the rotor 8 which, as shown in the drawing, is located between the hopper 7 and the crosswall 12. It is contemplated that the rotor will be driven in a clockwise direction when viewed from above. The discharge opening 21 is controlled by the valve 10 as hereinafter described and is positioned adjacent or nearest to the left hand end of the discharge slot, i. e., the end of the slot that is at the left when the housing is in its operative position. The lower end of the hopper 7 is reenforced by way of a U-shaped bracket 22 which is in the form of a one-piece metal stamping and consists of a horizontally extending crosspiece 23 and a pair of upstanding end pieces 24. The crosspiece underlies and extends across the bottom face of the bottom wall 18 of the hopper and has a circular hole 25 and a circular opening 26. The hole 25 corresponds in diameter to, and is in registry with, the hole 20 and the opening 26 corresponds in diameter to, and is in registry with, the discharge opening 21. The end pieces 24 embody at the upper ends thereof upwardly and outwardly extending ears 27 and these are welded, soldered or otherwise fixedly secured to diametrically opposite portions of the lower end of the side wall 17 of the hopper.

The rotor 8 is located in the central portion of the cylindrical housing 6 and consists of a horizontally extending, circular plate 28 and a plurality of radially extending blades 29 on the top face of the plate. The plate is disposed a small distance above the crosswall 12 and has a central hole through which extends a vertically extending drive shaft 30. A collar 31 serves to connect the rotor 8 for drive by the drive shaft. This collar is mounted fixedly on the central portion of the shaft 30 and underlies and is suitably fixedly secured to the central portion of the plate 28 of the rotor. The upper end of the drive shaft 30 extends through, and is journalled in, the holes 25 and 20 and embodies a reduced screw threaded stem 32. The lower end of the shaft extends through, and is journalled in, a hole 33 in the central portion of the crosswall 12 and embodies a reduced screw threaded stem 34. The blades 29 of the rotor are preferably four in number. They are in the form of sheet metal stampings and have along the bottom margins thereof horizontally extending, right angle flanges 35 which rest on, and are welded, soldered or otherwise fixedly secured to the top face of the circular plate 28. When the rotor 8 is driven in a clockwise direction in connection with use or operation of the device the material which is fed downwards through the discharge opening 21 in the bottom wall of the hopper flows onto the central portion of the plate 28 and is flung outwards by the blades 29 through the discharge slot 11 in the lower front portion of the housing 6. The material is flung outwards in response to the action of centrifugal force and is discharged in a highly scattered fashion. The upper marginal portions of the blades are bent at an angle of approximately 45° in the direction of rotation of the rotor in order to prevent the material in connection with drive of the rotor from working over the blades. By having the discharge opening 21 located nearest the left hand end of the discharge slot and the rotor driven in a clockwise direction all of the material that drops onto the plate of the rotor is discharged by the blades 29 before the blades pass successively by the right hand end of the discharge slot and hence no material is carried by the plate beyond the discharge slot.

In addition to the parts heretofore mentioned the spreader-device comprises blades 36. These blades are preferably two in number and directly overlie the bottom wall 18 of the hopper 7. They are connected to, and radiate from, a hub 37 which is mounted on the reduced screw threaded stem 32 and is clamped in place by way of a nut 38. The nut serves drivably to connect the collar together with the blades to the drive shaft 30. The blades 36 are positioned one diametrically opposite the other and are angularly positioned so that they extend at approximately a 45° angle with respect to the horizontal. The angularity is such that the blades are upwardly inclined in the direction of rotation of the drive shaft and rotor. The blades 36 have a twofold purpose in that they agitate and prevent clogging or caking of the material in the lower end of the hopper and deflect or direct the material into and through the discharge opening 21 in the bottom wall 18 of the hopper. In connection with operation of the device the blades 36 sweep over and around the hopper bottom wall and, due to their angular arrangement, they operate as they pass successively over the discharge opening 21 to force the material through the opening with a wedge or cam action.

The gearing 9 for driving the rotor 8 is located for the most part under the crosswall 12 in the lower portion or end of the housing 6 and consists of a crank 39, a bevel gear 40, a bevel pinion 41, a gear 42 and a pinion 43. The crank 39 is located at the right hand side of the housing and has at one end thereof a handle 44 whereby it may be turned. The other end of the crank extends horizontally and passes through a hole 45 in the lower end of the housing 6 and is supported rotatably by way of an inverted U-shaped bracket 46. The hole 45 is located adjacent and slightly below the right hand end of the discharge slot 11. The bracket 46 is in the form of a metallic stamping and consists of a crosspiece 47 and a pair of depending end pieces 48. The crosspiece 47 fits against, and is welded, soldered or otherwise fixedly secured to, the bottom face of the crosswall 12. The depending end pieces 48 of the bracket 46 have aligned, centrally disposed holes 49 in which said other end of the crank 39 is journalled. The bevel gear 40 is mounted on, and fixedly secured to, said other end of the crank 39 and is disposed between the depending end pieces 48 of the bracket 46. The bevel pinion 41 meshes with, and is driven by, the bevel gear 40 and is rotatably mounted on the lower end of a vertically extending spindle 50. The upper end of the spindle is fixedly secured to the crosspiece 47 of the inverted U-shaped bracket 46. The gear 42 overlies the bevel pinion 41 and is rotatably mounted on the central portion of the spindle 50. It has its central portion fixedly connected to the upper end of the bevel pinion 41 and meshes with, and serves to drive, the pinion 43. The latter is mounted on the reduced screw threaded stem 34 and is held in fixed or clamped relation with the lower end of the drive shaft 30 by way of a nut 51 on the lower end of the stem 34. When the crank 39 is properly turned by the user of the spreader-device it operates through the medium of the bevel gear 40 and the bevel pinion 41, the gear 42 and the pinion 43 to rotate in a clockwise direction the shaft 30, which, in turn, effects drive of the rotor 8 on the central portion of the drive shaft and the blades 36 on the upper end of the drive shaft. As heretofore pointed out, when the rotor is driven it operates to fling outwards through the discharge slot 11 the material that is fed onto the plate 28 of the rotor by the hopper 7.

The valve 10 serves to control the flow of material through the discharge opening 21 in the bottom wall 18 of the hopper 7. It is in the form of a plate and fits against the bottom face of the crosspiece 23 of the U-shaped bracket 22. A rivet 52 serves to support the valve 10 so that it is capable of being swung back and forth between open and closed positons. As shown in the drawing, the rivet 52 extends through aligned holes in the valve and the crosspiece of the bracket 22. Swinging of the valve into and out of its closed position is effected by way of a horizontally extending arm 53. One end of the arm is connected to the plate valve and the other end extends through the discharge slot 11 in the lower front portion of the housing 6 and has an upturned handle. When the arm is swung horizontally in one direction it operates to swing the plate valve 10 into its open position and when it is swung reversely, i. e., in the opposite direction, it operates to swing the plate valve into its closed position. Swinging movement of the valve is limited as the result of the arm 53 striking against the portions of the housing side wall that define the ends of the arcuate discharge slot 11.

When it is desired to use the device the hopper is filled with the fertilizer, grass seed or other material that is to be spread on the lawn. The device is then shifted into its operative position wherein it is disposed in front of the body of the user and is supported by the neck encircling strap 15. After proper positioning of the device the valve 10 is swung into its open position and the crank 39 is turned. In connection with turning of the crank the rotor operates to fling outwards in a highly scattered fashion the material that is fed onto it from the hopper 7. During drive of the rotor the blades 36 which rotate conjointly with the rotor agitate the material in the lower end of the hopper and, as previously pointed out, force the material downwards through the discharge opening 21 onto the central portion of the plate 28 of the rotor.

The herein described spreader-device effectively and efficiently fulfills its intended purpose and, due to its construction and design, may be operated with facility.

The invention is not to be understood as restricted to the details set forth since these may be modified within the scope of the appended claims without departing from the spirit and scope of the invention.

Having thus described the invention, what I claim as new and desire to secure by Letters Patent is:

1. A portable device designed to spread scattery material and comprising a vertically elongated housing adapted to be positioned and held in front of the body of the user of the device, having an open top, and embodying a horizontal discharge slot in its front lower portion, a hopper for the material, disposed in the upper portion of the housing and having at the lower end thereof a discharge opening, a horizontal blade equipped rotor disposed in the housing beneath the hopper and in alignment with the discharge slot, and adapted to receive the material from the hopper via said discharge opening and when driven to fling the material in a highly scattered manner outwards through said discharge slot, means disposed for the most part within the housing and operative to drive the rotor in one direction, and a horizontal blade disposed in the hopper directly over the discharge opening, connected for conjoint drive with the rotor, arranged in such angular position that it is inclined upwards in the direction of drive of the rotor, and adapted when driven to agitate the material in the lower end of the hopper and also to force it downwards through the discharge opening with a wedge action.

2. A portable device designed to spread scattery material and comprising a vertically elongated housing adapted to be positioned and held in front of the body of the user of the device, having an open top, and embodying a continuous side wall with a horizontal discharge slot in its front lower portion only, a hopper for the material, disposed in the upper portion of the casing and having at the lower end thereof a discharge opening, a plate valve for controlling the discharge opening, mounted so that it is shiftable horizontally into and out of closed position, and provided with a horizontal shifting arm extending outwards through the discharge slot, a horizontal blade equipped rotor disposed in the housing beneath the hopper and in alignment with the discharge slot, and adapted to receive the material from the hopper via said discharge opening and when driven to fling the material in a highly scattered manner outwards through said discharge slot, and means disposed for the most part within the housing and operative to drive the rotor.

3. A portable device designed to spread scattery material and comprising a vertically elongated housing adapted to be positioned and held in front of the body of the user of the device, having an open top, and embodying a continuous cylindrical side wall with a horizontal arcuate discharge slot in its front lower portion only, a funnel-shaped hopper for the material, disposed in the upper portion of the housing and having at the lower end thereof a discharge opening, a horizontally extending plate valve for controlling the discharge opening, mounted to swing horizontally into and out of a closed position, and provided with a horizontal operating arm extending outwards through the discharge slot, a horizontal blade equipped rotor disposed in the housing beneath the hopper and in alignment with the discharge slot, and adapted to receive the material from the hopper via said discharge opening and when driven to fling the material in a highly scattered manner outwards through said discharge slot, and means disposed and confined for the most part within the housing and operative to drive the rotor.

4. A portable device designed to spread scattery material and comprising a vertically disposed housing adapted to be positioned and held in front of the body of the user of the device, having an open top, and embodying a continuous cylindrical side wall with a horizontal arcuate discharge slot in its front lower portion, a crosswall mounted fixedly within the housing beneath the slot and provided with a central hole therein, a hopper for the material disposed in the upper portion of the housing and consisting of a downwardly tapered side wall of circular cross section and a flat circular bottom wall extending across the lower end of the side wall and provided with a central hole in vertical alignment with the hole in the crosswall and a discharge opening at one side of the second mentioned hole, a vertically extending drive shaft disposed centrally within the housing and having the upper end thereof extending through the central hole in the crosswall of the hopper and its lower end extending through the hole in the first mentioned crosswall, a horizontal blade equipped rotor positioned in the housing beneath the hopper and in alignment with the discharge slot, mounted on the central portion of the drive shaft and adapted to receive the material from the hopper via said discharge opening and when driven to fling the material in a highly scattered manner outwards through said discharge slot, manually operable gearing for driving the rotor in one direction, disposed for the most part within the lower portion of the housing and including a gear mounted on the lower end of the drive shaft, and a plurality of blades connected fixedly to, and projecting radially from, the upper end of the drive shaft, arranged angularly in such manner that they are upwardly inclined in the direction of drive of the rotor, and adapted during drive thereof by the drive shaft to agitate the material in the lower end of the hopper and also force it downwards through the discharge opening with a wedge action.

JOHN McELHATTON.

REFERENCES CITED

The following references are of record in the file of this patent:

UNITED STATES PATENTS

| Number | Name | Date |
|---|---|---|
| 963,067 | Rittenhouse | July 5, 1910 |
| 2,418,546 | Comtois | Apr. 8, 1947 |

FOREIGN PATENTS

| Number | Country | Date |
|---|---|---|
| 275,812 | Germany | June 27, 1914 |
| 322,359 | Germany | June 28, 1920 |